United States Patent
Baxansky et al.

(10) Patent No.: US 8,698,905 B2
(45) Date of Patent: Apr. 15, 2014

(54) ESTIMATION OF POINT SPREAD FUNCTIONS FROM MOTION-BLURRED IMAGES

(75) Inventors: Artemy Baxansky, Nesher (IL); Meir Tzur, Haifa (IL)

(73) Assignee: CSR Technology Inc., San Jose, CA (US)

( * ) Notice: Subject to any disclaimer, the term of this patent is extended or adjusted under 35 U.S.C. 154(b) by 507 days.

(21) Appl. No.: 12/721,263

(22) Filed: Mar. 10, 2010

(65) Prior Publication Data

US 2010/0231732 A1    Sep. 16, 2010

Related U.S. Application Data

(60) Provisional application No. 61/159,146, filed on Mar. 11, 2009.

(51) Int. Cl.
*H04N 5/228* (2006.01)

(52) U.S. Cl.
USPC ............................ 348/208.6; 348/208.4

(58) Field of Classification Search
USPC .................. 348/208.1, 208.6, 208.99
See application file for complete search history.

(56) References Cited

U.S. PATENT DOCUMENTS

| | | | | |
|---|---|---|---|---|
| 6,731,332 | B1 * | 5/2004 | Yasui et al. | 348/148 |
| 7,421,091 | B2 * | 9/2008 | Satoh | 382/103 |
| 7,750,942 | B2 * | 7/2010 | Inaba et al. | 348/208.1 |
| 2003/0011717 | A1 * | 1/2003 | McConica | 348/699 |
| 2004/0233300 | A1 * | 11/2004 | Satoh | 348/239 |
| 2005/0231603 | A1 | 10/2005 | Poon | |
| 2005/0243178 | A1 * | 11/2005 | McConica | 348/208.99 |
| 2006/0098890 | A1 | 5/2006 | Steinberg et al. | |
| 2008/0030587 | A1 * | 2/2008 | Helbing | 348/208.4 |
| 2008/0170124 | A1 | 7/2008 | Hatanaka et al. | |
| 2008/0232707 | A1 | 9/2008 | Lee et al. | |
| 2008/0253675 | A1 | 10/2008 | Chou et al. | |
| 2008/0253676 | A1 * | 10/2008 | Oh et al. | 382/255 |
| 2009/0046161 | A1 * | 2/2009 | Steinberg et al. | 348/208.6 |
| 2009/0115857 | A1 * | 5/2009 | Li et al. | 348/208.1 |
| 2009/0147090 | A1 * | 6/2009 | Miki | 348/208.1 |
| 2009/0213231 | A1 * | 8/2009 | Kurokawa | 348/208.1 |
| 2009/0244300 | A1 * | 10/2009 | Levin et al. | 348/208.5 |
| 2009/0297056 | A1 * | 12/2009 | Lelescu et al. | 382/261 |

OTHER PUBLICATIONS

R. Fergus et al., "Removing camera shake from a single photograph", presented at SIGGRAPH 2006, Boston.

(Continued)

*Primary Examiner* — Sinh Tran
*Assistant Examiner* — Christopher K Peterson
(74) *Attorney, Agent, or Firm* — Frommer Lawrence & Haug LLP; John W. Branch

(57) ABSTRACT

Methods for estimating the point spread function (PSF) of a motion-blurred image are disclosed and claimed. In certain embodiments, the estimated PSF may be used to compensate for the blur caused by hand-shake without the use of an accelerometer or gyro. Edge spread functions may be extracted along different directions from straight edges in a blurred image and combined to find the PSF that best matches. In other embodiments, the blur response to edges of other forms may similarly be extracted, such as corners or circles, and combined to find the best matching PSF. The PSF may then be represented in a parametric form, where the parameters used are related to low-order polynomial coefficients of the angular velocity $v_x(t)$ and $v_y(t)$ as a function of time.

24 Claims, 4 Drawing Sheets

(56) References Cited

OTHER PUBLICATIONS

M. Cannon, "Blind deconvolution of spatially invariant image blurs with phase", IEEE Transactions on Acoustics, Speech, and Signal Processing, vol. ASSP-24, No. 1, pp. 58-63, Feb. 1976.

J.W. Choi et al., "An algorithm to extract camera shaking degree and noise variance in the peak-trace domain", IEEE Transactions on Consumer Electronics, vol. 44, Issue 3, pp. 1159-1168, Aug. 1998.

International Search Report and Written Opinion for International Patent Application No. PCT/US2010/026852 mailed Apr. 28, 2010.

* cited by examiner

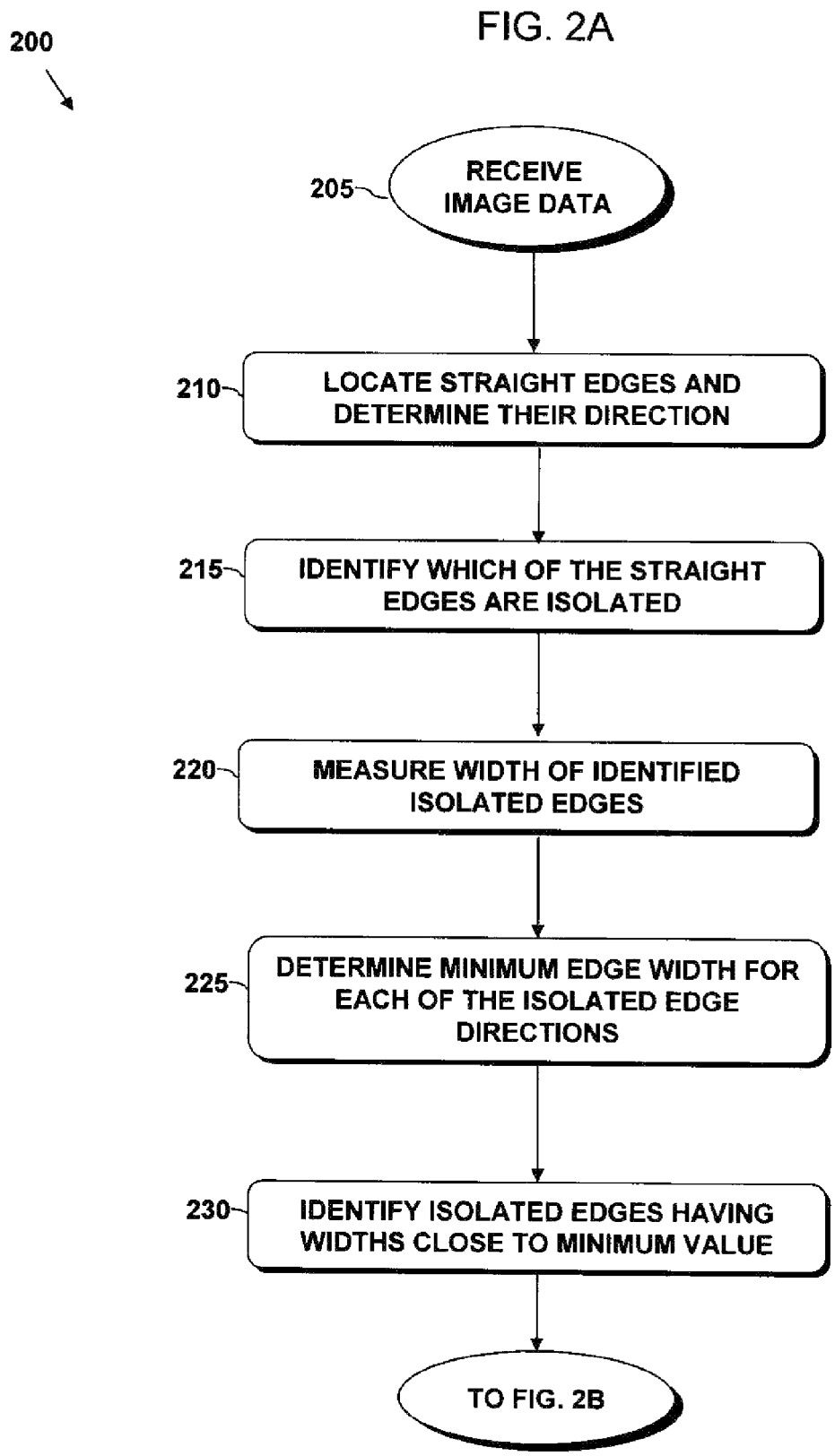

FROM FIG. 2A

235 — ESTIMATE THE ESF FOR EACH DIRECTION BY ALIGNING AND AVERAGING THE EDGES HAVING A WIDTH NEAR THE MINIMUM

240 — EXCLUDE THOSE EDGE WIDTHS THAT ARE INCONSISTENT WITH OTHER WIDTHS

245 — DETERMINE ANGULAR VELOCITY PARAMETERS THAT BEST MATCH ESTIMATED ESFS

250 — CALCULATE CORRESPONDING PSF

255 — APPLY BLUR CORRECTION WITH ESTIMATED PSF

260 — OUTPUT IMAGE

ESTIMATION OF POINT SPREAD FUNCTIONS FROM MOTION-BLURRED IMAGES

CROSS-REFERENCE TO RELATED APPLICATION

This application claims the benefit of U.S. Provisional Application No. 61/159,146, filed Mar. 11, 2009.

FIELD OF THE INVENTION

The present invention relates in general to de-blurring digital images and in particular to estimating the point spread function (PSF) of a motion-blurred image, such as images blurred by the user's hand moving or shaking while holding a camera.

BACKGROUND

With digital cameras, the problem of hand-shake blur has been addressed in several different ways. In the case of high-end and middle-end cameras, a built-in accelerometer or gyro type circuitry, together with an optical stabilizer, has been used. With this approach, the gyro would measure the camera motion and, in accordance with the gyro signal, a controller would move the lens relative to the sensor (or vice versa) in the opposite direction. This approach compensates for hand-shake and general user motion during the image capturing process, although there are limitations on the performance of optical stabilizers as well.

Another approach to addressing the hand-shake blur problem is to actually restore a blurred image digitally. For this approach, PSF must be known. The PSF can be measured using gyro type circuitry, such as that found in higher- or middle-end cameras. However use of a gyro results in a commensurate increase in the cost of the camera, and is therefore not ideal.

Therefore, it is desirable to have a method for estimating the PSF from the blurred image itself that does not rely on the use of an accelerometer or gyro-type circuitry.

To that end, there are known methods for estimating the PSF from a single motion blurred image. Some methods assume that the motion is constant and that the PSF can be characterized by only two parameters—the length and the angle of inclination. However, this assumption is unrealistic and does not accurately represent the PSF for most real-life conditions. Other PSF estimation techniques require a global analysis of the image and rely on the statistical properties of natural images, such as the distribution of gradients or behavior of the Fourier transformation.

However, there remains a need in the art for a PSF estimation technique that does not rely on a gyro, but is still robust, accurate, and simple enough for implementation in a consumer-level digital camera.

BRIEF SUMMARY OF THE INVENTION

Disclosed and claimed herein are techniques for estimating the point spread function in connection with processing motion-blurred images. In one embodiment, a method of de-blurring images comprises receiving image data corresponding to a captured image, identifying isolated edges within the captured image, and then estimating edge spread functions corresponding to each of the identified isolated edges. The method further includes determining the best matching angular velocity parameters to the edge spread functions and calculating the point spread function from the determined angular velocity parameters. Thereafter, the image data may be de-blurred using the calculated point spread function.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 2A-2B depict one embodiment of a process for implementing one or more aspects of the invention.

DETAILED DESCRIPTION OF EXEMPLARY EMBODIMENTS

Overview and Terminology

Figure 1:
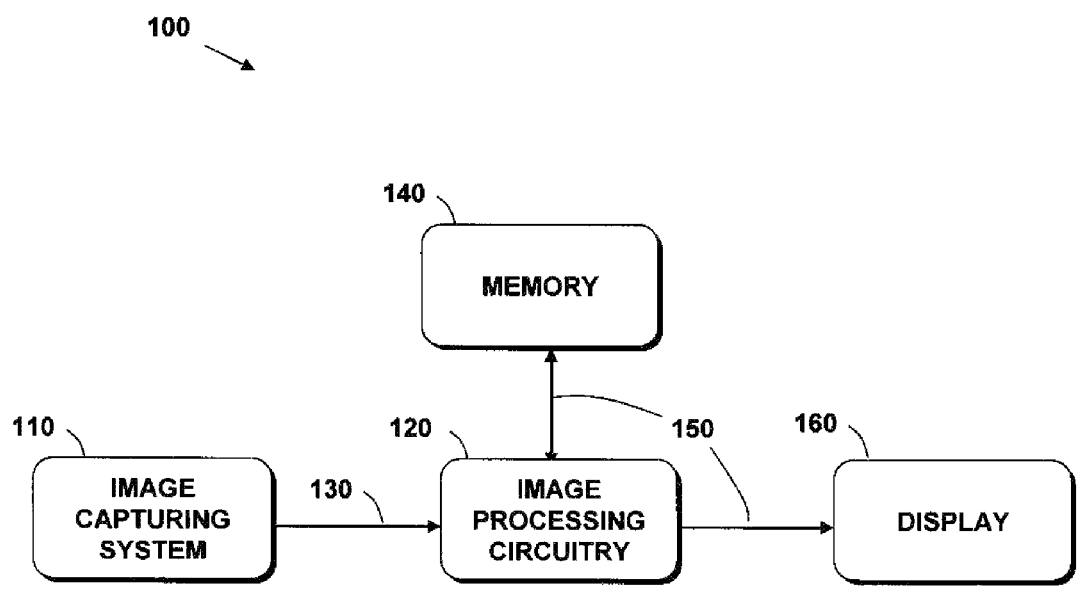
FIG. 1 depicts a simplified block diagram of a device configured to implement one or more aspects of the invention.

The present disclosure relates to estimating the point spread function (PSF) of a motion-blurred image. Specifically, compensating for the blur caused by hand-shake of a user holding the camera. The present approach enables blur correction without the use of an accelerometer or gyro.

One aspect of the disclosure is to extract the edge spread functions (ESFs) along different directions from straight edges in the blurred image (e.g., edges having a step shape or narrow lines), and combining this information to find the PSF that best matches it. Additionally, the blur response to edges of other forms may similarly be extracted, such as corners or circles, and combined to find the best matching PSF.

Another aspect of the invention is to represent the PSF in a parametric form, where the parameters used are related to low-order polynomial coefficients of the angular velocity $vx(t)$ and $vy(t)$ as a function of time.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Exemplary Embodiments

FIG. 1 depicts a simplified block diagram of a digital camera 100 configured to implement one or more aspects of the invention. In particular, camera 100 includes an image capturing system 110. The image capturing system 110 may include any form or combination of an optical lens and a light sensing IC. As is generally known, the optical lens typically including lenses and beam splitters to form images using the incident light. The light sensing IC will typically include light sensing elements that are aligned to the images formed by the optical lens, and then convert the light sensed into corresponding electrical signals which are then provided to the image processing circuitry 120 as captured image data 130. It should be appreciated that the image processing circuitry 120 may be implemented using one or more integrated circuit microprocessors, microcontrollers and/or digital signal processors.

Image processing circuitry 120 may be configured to process the received image data based on, for example, specific image processing algorithms stored in memory 140 in the form of processor-executable instruction sequences. The image processing circuitry 120 may then provide processed image data 150 to memory 140 for storage and/or to display 160 for viewing. It should be appreciated that memory 140 may include any combination of different memory storage devices, such as a hard drive, random access memory, read only memory, flash memory, or any other type of volatile and/or nonvolatile memory. It should further be appreciated that memory 140 may be implemented as multiple, discrete memories for storing processed image data 150, as well as the processor-executable instructions for processing the captured image data 130.

The display 160 may comprise a display, such as a liquid crystal display screen, incorporated into the camera 100, or it may alternatively be any external display device to which the camera 100 may be connected.

Referring now to FIG. 2A, depicted is one embodiment of a process 200 for carrying out one or more aspects of the invention. In certain embodiments, process 200 may be performed by one or more processors (e.g., image processing circuitry 120 of FIG. 1) of a digital camera (e.g., camera 100 of FIG. 1).

Rather than summing some quantity over the whole image and calculating statistical properties, one aspect of the invention is to consider only specific places in the image that contain the most information about the PSF. Specifically, such places are straight edges lying in different directions. Assuming that the edge in the underlying (unblurred) image is a step function (i.e. having a zero width), the cross-section of the edge in the blurred image gives the edge spread function (ESF) in the direction of the edge, i.e. the integral of the PSF in the direction perpendicular to the edge. Therefore, once ESFs along a sufficient number of directions are identified, it becomes possible to reconstruct the PSF from those ESFs. While the following disclosure refers to the use of straight edges, it should be equally appreciated that the features to be analyzed need not be limited to straight edges, but also be (or include) other shapes such as lines, corners or circles.

With that approach in mind, process 200 begins at block 205 where captured image data is received. Process 200 continues to block 210 where received (blurred) image data is analyzed in order to locate straight edges from which to extract the ESFs along different directions. It should be appreciated that the image data may include color or gray-scale image data. In the case of color image data, the analysis can be done on all three color components (R,G,B). Alternatively, it may only be done on the luminance component, or color components in another color space.

Figure 3:
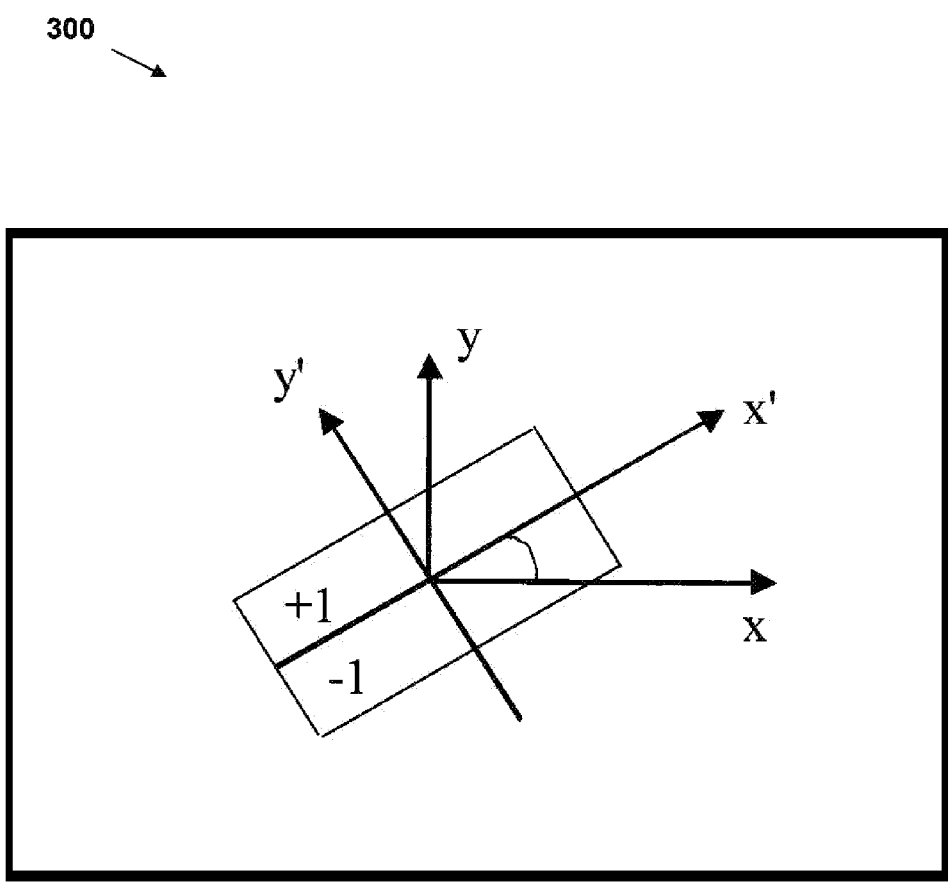
FIG. 3 depicts one embodiment of a template for use in a template-matching technique for locating straight edges.

In any event, in order to locate straight edges in a particular direction $\phi$, a template-matching technique may be used. By way of a non-limiting example, the template 300 of FIG. 3 is a rectangle inclined at angle $\phi$ relative to the x-axis. The upper half of template 300 (y'>0) has the value of +1 and the lower half (y'<0) has the value of −1. The normalized cross-correlation with template 300 detects straight edges in direction $\phi$ having a step shape (i.e. flat regions on both sides of the edge). The cross-correlation may be calculated between the image and the templates having different angles of inclination. The direction of the edge is taken to be the one in which the cross-correlation value is maximal. Since the input image is assumed to be blurred, there may be a need to downscale the image prior to searching for straight edges.

Referring back to FIG. 2A, after the edge candidates have been found at block 210, process 200 may then continue to block 215 where cross-section of each candidate edge may be analyzed to ensure it is a single, isolated edge, so that its cross-section will be closely correlated to the ESF in the corresponding direction. Given an edge candidate in direction $\phi$, a one-dimensional cross-section v[n] in the direction perpendicular to $\phi$ can be extracted from the full-resolution image. An edge is isolated when the cross-section u[n] of the edge is a smoothed version of a step function and is practically flat on both sides of the edge. In order to check for each candidate whether the edge is isolated, two steps can be performed. First, the edge end points can be identified. Second, whether the cross-section v[n] on both sides of the edge is flat can be checked. Due to the presence of noise, identifying the edge end points could be complicated. In particular, two intervals of increase of v[n] separated by an interval of decrease may actually belong to the same edge. This problem can be solved by starting with the interval of maximum increase of u[n] and then merge it iteratively with adjacent pairs of intervals as described in more detail below. Let us denote by $i_k$ and $j_k$ the local minimum and maximum points, respectively, of v[n]. Without loss of generality, assuming that $i_k < j_k$ for each k, the outputs can be two indices l and m, which define the edge end points $i_l$ and $j_m$. By starting with the interval of maximum increase, say $[i_r, j_r]$, and setting m=r, at each iteration, the interval $[i_r, j_m]$ can be merged with $[j_m, i_{m+1}]$ and $[i_{m+1}, j_{m+1}]$, until one of the following two conditions is met. The first condition is that the highest point of the cross-section has been reached, in which case $j_m$ is the maximum end point. The second condition is that the height of the next interval of decrease on the right exceeds a certain percentage of the edge height, which means that the cross-section cannot result from an isolated edge. This edge candidate can then be discarded. The minimum edge point $i_l$ can be found in a similar procedure as described above in connection with the finding of the maximum edge point $j_m$. Thereafter, at block 220, the width of each single, isolated edge can be measured. Having located the end points $i_l$ and $j_m$, in the present embodiment, the effective edge width w can be calculated as the distance in pixels from 10% to 90% of the edge height in the direction of the maximum change. In another embodiment, the effective width w of the edge can be calculated as the distance in pixels from 5% to 95% of the edge height. For each direction, the minimum edge width may then be determined at block 225. Edges having widths close to the minimum value may then be identified or selected at block 230. In other words, assuming the minimum edge width in a particular direction is $w_{min}$, then an edge of width w may be identified or selected if $w \leq w_{min} + \Delta w$, where $\Delta w$ is a tolerance parameter. In general, $\Delta w$ may be commensurate to the accuracy with which edge spread functions can be estimated (which in turn depends on both the blur size and the quality of the image). In the present embodiment, $\Delta w = 2$ pixels.

At this point, process 200 continues from FIG. 2A to FIG. 2B where the cross-sections of the selected edges having a width near the minimum in each direction are aligned and averaged, so as to be able to estimate the ESF. (block 235).

The edge widths are compared among the various directions, and the directions which are inconsistent with the rest of the directions (e.g., too large or too narrow of a width) may be excluded as outliers (block 240).

Besides straight edges having a step shape, the ESFs can be also extracted from narrow straight lines, as previously mentioned. Assuming that the line in the unblurred image has a width much smaller than the PSF extension, the cross-section of the line in the blurred image should be closely correlated with the projection of the PSF on the direction perpendicular to the line, or the line spread function (LSF). In order to get an estimate for the ESF, it may be necessary to integrate the LSF along the cross-section of the blurred line.

It should further be appreciated that the straight edges in the blurred image may be found using other known means without deviating from the scope and spirit of the present disclosure (e.g., Canny edge detector).

Once the desired set of ESFs have been estimated, process 200 may then continue to block 245 where the angular velocity parameters that best match the extracted ESFs may be determined. For example, assume that the angular velocity of a camera along the x-axis and y-axis, respectively, during the exposure may be approximated as a piecewise low-order polynomial function. In the particular case of a linear function, we have:

$$v_x(t) = v_{x0} + v_{x1} \cdot t, \text{ and}$$

$$v_y(t) = v_{y0} + v_{y1} \cdot t.$$

where,
t is the normalized time (for example, between $-\frac{1}{2}$ and $\frac{1}{2}$);
$v_{x0}$ = angular velocity along the x-axis at t=0;
$v_{x1}$ = the slope of the angular velocity along the x-axis as a function of the normalized time;
$v_{y0}$ = angular velocity along the y-axis at t=0; and
$v_{y1}$ = the slope of the angular velocity along the y-axis as a function of the normalized time.

Then the velocity in the direction perpendicular to $\phi$ is given by:

$$v_\phi(t) = v_{\phi 0} + v_{\phi 1} \cdot t$$

where, $$v_{\phi 0} = -v_{x0} \cdot \sin\phi + v_{y0} \cdot \cos\phi, \text{ and}$$

$$v_{\phi 1} = -v_{x1} \cdot \sin\phi + v_{y1} \cdot \cos\phi.$$

Assuming that the normalized time is sampled at equidistant points $t_k$, k=1, ..., K, the projection of the path traced by an image point on the direction perpendicular to $\phi$ is described by $$r_\varphi[k] = round\left(v_{\varphi 0} \cdot t_k + \frac{1}{2} v_{\varphi 1} \cdot t_k^2\right).$$

The projection of the PSF on the direction perpendicular to $\phi$ can be approximately computed as follows:

$$h_\varphi[n] = \frac{1}{K} \sum_{k=1}^{K} 1_{\{r_\varphi[k]=n\}},$$

where $1\{\bullet\}$ is the indicator function.

Then the step response, or the ESF, in the direction perpendicular to $\phi$ is given by $$u_\varphi[n] = \sum_{n' \leq n} h_\varphi[n'].$$

Let $E_\phi[n]$ be the estimates of the ESFs extracted from the blurred image in different directions $\phi$. Then the cost function of the PSF with parameters $v_{x0}$, $v_{x1}$, $v_{y0}$, $v_{y1}$ expresses the dissimilarity between the ESFs extracted from the image and the ESFs corresponding to the PSF at hand. A possible example of the cost function is $$J(v_{x0}, v_{x1}, v_{y0}, v_{y1}) = \sum_\varphi w_\varphi \sum_n |E_\varphi[n] - u_\varphi[n](v_{x0}, v_{x1}, v_{y0}, v_{y1})|,$$

where $w_\phi$ are the weights assigned to different directions.

The estimated angular velocity parameters are those minimizing the cost function $J(v_{x0}, v_{x1}, v_{y0}, v_{y1})$.

Once the angular velocity parameters have been obtained, process 200 may continue to block 250 where the PSF is calculated from the angular velocity parameters.

With respect to the way the PSF may be represented, it is noted that the main reason for which most of the methods for blind deconvolution are unstable is that, in general, a PSF has a large number of degrees of freedom. For example, if it is known that the PSF size is limited to 20×20 pixels, theoretically the PSF has 400 degrees of freedom (20*20). Therefore, to estimate the PSF it would be necessary to solve for 400 unknown variables. To do so in a stable manner, one would need at least 400 independent equations to achieve robustness against noise and other inaccuracies. It would be very difficult (if not practically impossible) to extract so many independent constraints from a single image. On the other hand, if we have fewer independent constraints, the system of equations becomes underdetermined, meaning that there can be many different PSFs that satisfy the constraints. For this reason, optimization for so many degrees of freedom can get trapped in a local minimum, and yield a PSF that is very different from the true PSF.

With the above in mind, the invention takes advantage of the fact that the motion causing the undesired blurring results from hand shake, which is generally limited to rotations along two axes forming a plane approximately parallel to the sensor plane (denoted as x- and y-axes). The angular velocities may be represented as a function of time along the two axes as $v_x(t)$ and $v_y(t)$, where $0 \leq t \leq T$, where T is the exposure duration. If it is further assumed that $v_x(t)$ and $v_y(t)$ are sampled at equidistant points, then the PSF h[n,m] may be calculated as follows:

```
Initialization:
H[n,m] = 0 for all n,m;
x = 0;
y = 0;
for (i=1; i<=N; i++) {
    x = x + K_x · v_x(t_i) · dt;
    y = y + K_y · v_y(t_i) · dt;
    m = round(x);
    n = round(y);
    h[n,m] = h[n,m] + dt;
},
``` where $K_x$ and $K_y$ are proportionality coefficients which depend on camera properties.

It is well-known that for a hand-shake motion, the frequency content of vx(t) and vy(t) is essentially limited to about 15 Hz, with most of the energy concentrated around 5 Hz. It means that the typical period of vx(t) and vy(t) is of the order of 200 msec. It is also known from the theory of interpolation that to describe a signal to a good approximation using a low-order polynomial interpolation, one needs approximately 5-10 samples (degrees of freedom) per signal period (the exact number depends on the desired accuracy and on the signal at hand). Therefore, for exposure times of 30-60 msec, it is reasonable to assume that 2-3 degrees of freedom suffice to accurately describe each of vx(t) and vy(t) during the exposure interval. In other words, vx(t) and vy(t) during the exposure interval can be approximately represented by a first-order or second-order polynomial.

Based on the above, the PSF we are solving for can be described in a parametric form with as few as four degrees of freedom. This drastically reduces the number of unknowns we need to estimate and therefore improves the stability of the PSF estimation. Further, the use of a small number of unknowns reduces the computational load needed for solving the optimization problem and makes it practical to implement such a solution on a small handheld device such as camera or camera-phone.

Once the PSF has been calculated at block 250, process 200 may then continue to block 255 where the estimated PSF may then be used to perform the actual image de-blurring (e.g., by image processing circuitry 120). The deblurring can be performed by using any suitable non-blind deconvolution algorithm. One example of such an algorithm is the Wiener filtering, where a regularized inverse filter is calculated from the PSF and then applied to the blurred image to produce the deblurred image. In the present embodiment, the Wiener filter is performed followed by a post-processing algorithm which is used for reducing ringing artifacts. The de-blurred image may then be output to either an electronic memory (e.g., memory 140) and/or to a display (e.g., display 160) at block 260. In this fashion, image de-blurring may be performed without the use of a gyro, but in a manner that is still robust, accurate, and simple enough for implementation in a consumer-level digital camera.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method of de-blurring images by estimating point spread functions (PSFs), the method comprising the acts of:
   receiving image data corresponding to a captured image;
   identifying a plurality of isolated shapes within the captured image and a minimum cross-section of the plurality of isolated shapes, wherein each of the plurality of isolated shapes has a cross-section that is less than a sum of the minimum cross-section and a tolerance parameter;
   estimating a plurality of shape spread functions corresponding to each of the plurality of isolated shapes;
   determining a plurality of best matching angular velocity parameters to said plurality of shape spread functions based on the image data which is separate from any mechanical motion data;
   calculating the PSF from the determined plurality of angular velocity parameters; and
   de-blurring said image data using a deconvolution operation with a regularized inverse filter that is calculated from the PSF.

2. The method of claim 1, wherein the plurality of shapes are a plurality of isolated edges having a corresponding plurality of directions and the plurality of shape spread functions are edge spread functions (ESFs) corresponding to each of the plurality of isolated edges.

3. The method of claim 2, wherein identifying the plurality of isolated edges comprises performing a template matching operation over a range of angles of inclination.

4. The method of claim 2, wherein each of the plurality of isolated edges has a width defined as a distance in pixels from 10% to 90% of an edge height in a direction of maximum change.

5. The method of claim 4, and wherein the plurality of isolated edges includes only isolated edges having widths close to a determined minimum.

6. The method of claim 2, wherein estimating the plurality of ESFs comprises aligning and averaging the cross-sections of each of the plurality of isolated edges in each of the plurality of directions.

7. The method of claim 2, further comprising:
   comparing the widths of the plurality of ESFs among the plurality of directions;
   excluding ESFs having widths that are inconsistent with the other ESFs.

8. The method of claim 1, wherein calculating the PSF comprises representing the PSF in parametric form using low-order polynomial coefficients of angular velocity.

9. A camera comprising:
   an image capturing system; and
   an image processing circuit coupled to the image capturing system, wherein the image processing circuit is to:
      receive image data corresponding to a captured image;
      identify a plurality of isolated shapes within the captured image and a minimum cross-section of the plurality of isolated shapes, wherein each of the plurality of isolated shapes has a cross-section that is less than a sum of the minimum cross-section and a tolerance parameter;

estimate a plurality of shape spread functions corresponding to each of the plurality of isolated shapes;

determine a plurality of best matching angular velocity parameters to said plurality of shape spread functions based on the image data which is separate from any mechanical motion data;

calculate the PSF from the determined plurality of angular velocity parameters; and de-blurring said image data using a deconvolution operation with a regularized inverse filter that is calculated from the PSF.

10. The camera of claim 9, wherein the plurality of shapes are a plurality of isolated edges having a corresponding plurality of directions and the plurality of shape spread functions are edge spread functions (ESFs) corresponding to each of the plurality of isolated edges.

11. The camera of claim 10, wherein the image processing circuit is to identify the plurality of isolated edges by performing a template matching technique over a range of angles of inclination.

12. The camera of claim 10, wherein each of the plurality of isolated edges has a width defined as a distance in pixels from 10% to 90% of an edge height in a direction of maximum change.

13. The camera of claim 12, and wherein the plurality of isolated edges includes only isolated edges having widths close to a determined minimum.

14. The camera of claim 10, wherein the image processing circuit is further to estimate the plurality of ESFs by aligning and averaging the cross-sections of each of the plurality of isolated edges in each of the plurality of directions.

15. The camera of claim 10, wherein the image processing circuit is further to:
compare the widths of the plurality of ESFs among the plurality of directions; and
exclude ESFs having widths that are inconsistent with the other ESFs.

16. The camera of claim 9, wherein the image processing circuit the PSF is represented in parametric form using low-order polynomial coefficients of angular velocity.

17. A computer program product embodied on a computer-readable non-transitory medium, wherein:
the computer-readable medium having computer executable program code embodied therein to de-blur images by estimating point spread functions (PSFs), the computer-readable medium having:
computer executable program code to identify a plurality of isolated shapes within image data corresponding to a captured image and a minimum cross-section of the plurality of isolated shapes, wherein each of the plurality of isolated shapes has a cross-section that is less than a sum of the minimum cross-section and a tolerance parameter;

computer executable program code to estimate a plurality of shape spread functions corresponding to each of the plurality of isolated shapes;

computer executable program code to determine a plurality of best matching angular velocity parameters to said plurality of shape spread functions based on the image data which is separate from any mechanical motion data;

computer executable program code to calculate the PSF from the determined plurality of angular velocity parameters; and computer executable program code to de-blur said image data using a deconvolution operation with a regularized inverse filter that is calculated from the PSF.

18. The computer program product of claim 17, wherein the plurality of shapes are a plurality of isolated edges having a corresponding plurality of directions and the plurality of shape spread functions are edge spread functions (ESFs) corresponding to each of the plurality of isolated edges.

19. The computer program product of claim 18, wherein the computer executable program code to identify the plurality of isolated edges comprises computer executable program code to perform a template matching operation over a range of angles of inclination.

20. The computer program product of claim 18, wherein each of the plurality of isolated edges has a width defined as a distance in pixels from 10% to 90% of an edge height in a direction of maximum change.

21. The computer program product of claim 20, and wherein the plurality of isolated edges includes only isolated edges having widths close to a determined minimum.

22. The computer program product of claim 18, wherein the computer executable program code to estimate the plurality of ESFs comprises computer executable program code to align and average the cross-sections of each of the plurality of isolated edges in each of the plurality of directions.

23. The computer program product of claim 18, further comprising computer executable program code to: compare the widths of the plurality of ESFs among the plurality of directions;
exclude ESFs having widths that are inconsistent with the other ESFs.

24. The computer program product of claim 17, wherein the computer executable program code to calculate the PSF comprises computer executable program code to represent the PSF in parametric form using low-order polynomial coefficients of angular velocity.

* * * * *